(12) United States Patent
Shaham

(10) Patent No.: US 11,363,169 B2
(45) Date of Patent: Jun. 14, 2022

(54) COLOR ADJUSTMENT SYSTEM AND METHOD

(71) Applicant: Hewlett-Packard Development Company, L.P., Spring, TX (US)

(72) Inventor: Noam Shaham, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/297,632

(22) PCT Filed: Dec. 18, 2018

(86) PCT No.: PCT/US2018/066236
§ 371 (c)(1),
(2) Date: May 27, 2021

(87) PCT Pub. No.: WO2020/131034
PCT Pub. Date: Jun. 25, 2020

(65) Prior Publication Data
US 2022/0030133 A1 Jan. 27, 2022

(51) Int. Cl.
*H04N 1/60* (2006.01)
*G06K 15/02* (2006.01)

(52) U.S. Cl.
CPC ....... *H04N 1/6008* (2013.01); *G06K 15/1836* (2013.01); *G06K 15/1878* (2013.01); *H04N 1/605* (2013.01)

(58) Field of Classification Search
CPC .. H04N 1/6008; H04N 1/605; G06K 15/1836; G06K 15/1878
See application file for complete search history.

(56) References Cited

U.S. PATENT DOCUMENTS

| 6,456,395 | B1 | 9/2002 | Ringness |
| 7,170,641 | B2 | 1/2007 | Brady |
| 7,791,776 | B2 | 9/2010 | Nielsen |
| 7,821,659 | B2 | 10/2010 | Kodama |
| 8,582,188 | B2 | 11/2013 | Sanchez |
| 8,723,982 | B2 | 5/2014 | Yanagita et al. |

(Continued)

FOREIGN PATENT DOCUMENTS

| EP | 0522702 B1 | 1/1999 |
| WO | WO-2015153764 | 10/2015 |

*Primary Examiner* — Quang N Vo
(74) *Attorney, Agent, or Firm* — HP Inc. Patent Department

(57) ABSTRACT

A method comprising determining a recipe vector of a recipe to a printing device, wherein the recipe is representative of a spot color in an input image, the recipe vector being based on one or more recipe color properties of the recipe, and determining a pixel vector of a pixel of an output of a printing device based on one or more pixel color properties of the pixel, wherein the pixel vector is representative of a spot color in an output of a printing device. The method also comprises comparing the recipe vector and pixel vector to determine a difference between the recipe and pixel and adjusting one or more pixel color properties of the pixel when the difference is below a predetermined threshold, to reduce the difference so as to substantially reproduce the spot color of the input image in the output of the printing device. The adjusted pixel color properties are then provided to the printing device.

12 Claims, 3 Drawing Sheets

(56) References Cited

U.S. PATENT DOCUMENTS

| | | |
|---|---|---|
| 8,743,421 B1 | 6/2014 | Ross, Jr. |
| 9,894,248 B2 | 2/2018 | Hirano |
| 9,992,376 B2 | 6/2018 | Shojaku |
| 2008/0043271 A1* | 2/2008 | Gil .................. H04N 1/6033 358/1.9 |
| 2009/0296113 A1* | 12/2009 | Mestha .............. H04N 1/62 358/1.9 |
| 2010/0182659 A1 | 7/2010 | Ochs et al. |
| 2010/0189348 A1 | 7/2010 | Dalal et al. |
| 2016/0080612 A1 | 3/2016 | Martinez De Salinas Vazquez |
| 2016/0173732 A1 | 6/2016 | Reyero Viñas |
| 2018/0121772 A1 | 5/2018 | Perdicaro |

\* cited by examiner

COLOR ADJUSTMENT SYSTEM AND METHOD

BACKGROUND

Spot colors are particular colors used during the printing process which are to be consistent throughout. Some spot colors, such as the Hewlett-Packard blue, can be linked with the brands they represent and therefore it is desirable to accurately reproduce them regardless of the number of copies, print medium, or other environmental factors. When printing these colors using traditional technologies, such as offset and gravure, one option is to have a dedicated printing fluid for printing that color

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
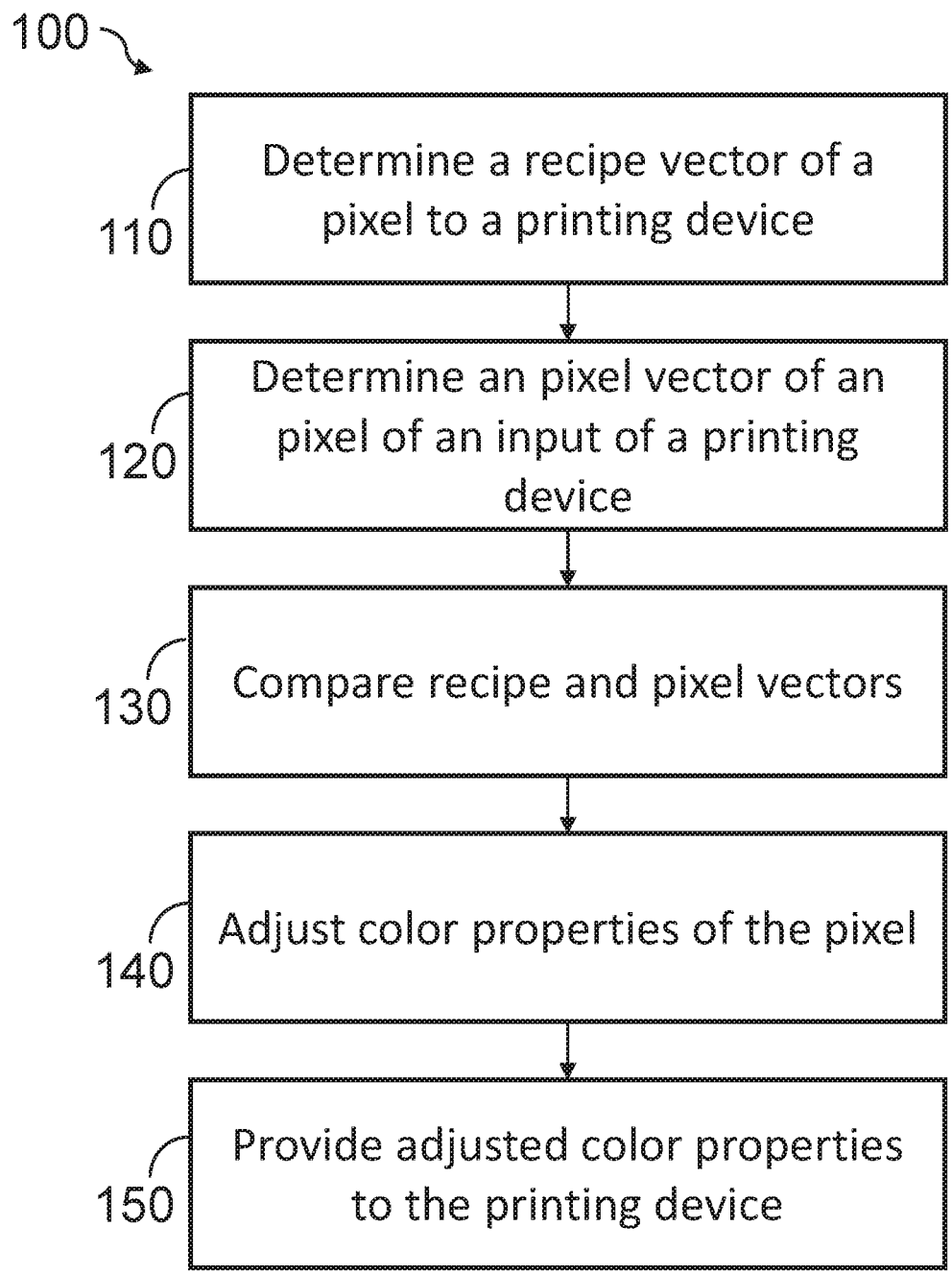
FIG. 1 is a flowchart illustrating a method according to an example.

Color can be represented within imaging devices such as print and display devices in a variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using a 24-bit RGB model may have three 8-bit values stored in a memory, wherein each value may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables (X, Y and Z or tristimulus values) are used to model a color; the CIE 1976 (L*, a*, b*—CIELAB or 'LAB') color space, in which three variables represent lightness (L*) and opposing color dimensions (a* and b*); the Yu'v' color space, in which three variables represent the luminance (Y) and two chrominance dimensions (u' and v')' and the IPT color space, in which the three variables represent a lightness dimension (I), a red-green dimension (P), and a yellow-blue dimension (T).

Representing colors, such as spot colors, which can include brand colors, accurately across various print systems, print mediums, and printing fluid types can be challenging. This is because such spot colors are often closely associated with the particular brand they represent, for example, the Hewlett-Packard Blue, and being able to accurately represent such colors on different mediums consistently and accurately, and at a minimum cost is often desirable. Due to the large number of different printed materials and items, such as item packaging, paperwork, letterheads, and other merchandise, for example, ensuring that the spot color is accurately represented on each of these printed materials, regardless of the printing fluids and print medium used can be difficult.

Inputs to a print system, may be represented in one color space, for example, the input may be an image having pixels defined using a 24-bit RGB color model, where each pixel is represented by three 8-bit values stored in a memory, each value being between 0 and 255 and representative of a red pixel value, a green pixel value, and a blue pixel value. As mentioned previously, some print systems comprise individual printing fluids for printing such spot colors, however, this is not always practical, and often increases the costs of producing the printed materials. In particular, the printing system may have at least one bespoke printing fluid (representative of the spot color(s) of an image), and additional hardware, or modifications to the hardware so that the bespoke printing fluid may be stored and used when printing the spot color onto a print medium.

In the digital printing technologies, the use of a dedicated printing fluid blend in addition to the standard process printing fluids is especially challenging since the usage model of a digital press is very different from the usage model of the analog, such as offset, or gravure, one. The main difference is that an analog press has a dedicated printing fluid that will reproduce a high number of copies, whereas a digital press may produce as little as a single copy. In some circumstances, installing a new printing fluid station and servicing it for a low number of copies can significantly increase the cost of digital reproduction.

An alternative solution is to use a combination of the printing fluids already present in the print system. For example, where a print system has printing fluids representing the regular process colors, Cyan, Magenta, Yellow, and Black ('CMYK'), and when the spot color is within the color gamut range of the process color combinations, a combination of those colors may be used to emulate the spot color in a printed output. It will be appreciated that other color systems may be used comprising different printing fluids and printing fluid combinations. However, when using the process colors to emulate the spot color, care needs to be taken to ensure consistency and accuracy of the emulation across multiple print outputs. Furthermore, care needs also be taken when the input image has a portion wherein the spot color is blended with another color or the color of the print substrate.

To ensure consistency and accuracy across multiple print outputs, corrections may be calculated and applied to the output throughout the print run. Usually, this is done for individual process colors. However, identifying emulated spot colors and correcting them to the desired tone can increase the color accuracy. It is an object of the present disclosure to identify emulated spot colors in an image produced using process colors and correct the output to ensure consistency and accuracy across a print run.

For examples, an input such as a print job in the form of a file (e.g. PDF), is sent to a processor, which may be a raster image processor (RIP) which separates the colors corresponding to the available printing fluids and creates separated images for each of them. In some examples, the processor may separate the input into the process colors and the spot colors. Where the print system does not comprise a specific printing fluid for the spot color, emulation takes place, and the processor creates separate images for the process colors. The spots are then converted to combinations of process colors based on a recipe. The recipe may be included in the job or may be sent to the processor separately. Usually, the recipe is a single point in the process color space representing the equivalent of a solid spot area. Shades of the spot may be emulated using the same coverage percentage on all color components. For example, if the HP Blue spot color recipe is CMYK is (1, 0.313, 0, 0.149) than a 50% shade of the HP Blue may be emulated by (0.5, 0.1565, 0, 0.0745), and 10% shade may be emulated by (0.1, 0.0313, 0, 0.0149). 'In some examples, the shade of the spot color may not follow the linear example above, however it will be appreciated that in other examples, the shade of the spot color may be located on a curve connecting the origin of the color space to the solid spot recipe.'

In many cases, the emulation recipe is a close approximation of the desired spot color. The final value is determined after printing. This may be an iterative process where the printing system prints and adjusts until reaching a satisfactory result. For example, in the HP Blue case, the original recipe CMYK is (1, 0.313, 0, 0.149) and in some examples may need to be adjusted to a new target of (1, 0.313, 0, 0.152) if the original did not produce a dark enough tone.

FIG. 1 is a flowchart illustrating a method 100 according to an example for ensuring accuracy and consistency across a print run according to examples. In broad terms, areas of the image which are representative of spot colors are determined and then adjusted for more consistent reproduction of the spot color.

At item 110, a spot color emulation recipe is defined as a vector within a color space. This combination of process colors may be used by the processor to emulate a solid, full coverage representation of spot. For example, where the general process colors (CMYK) are used the pixel vector may be represented as: $S_a=(C, M, Y, K)$ or, in another representation as a product of size and a gradient vector:

$$S_a = |S|*\vec{S_a} \text{ where } |S| = C + M + Y + K \text{ and } \vec{S_a} = \frac{(C, M, K, Y)}{|S|} \quad \text{(equation 1)}$$

where $S_a$ is a pixel vector, (C, M, Y, K) represents the coordinate of the input pixel, S, in the four-dimensional CMYK color space, and (C+M+Y+K) represents a scalar value computed by summing the C, M, Y, K component values of S. As such, input pixel S may be represented in a CMYK color space where each of the color axes, C, M, Y, K represent values of each individual printing fluid from zero to one. Therefore, $\vec{S_a}$ may be computed by dividing each of the component C, M, Y, K values by the sum of those values. For example, the HP Blue having a value (1.0C, 0.313M, 0Y, 0.149K) has a vector $\vec{S_a}$ computed by dividing each of the values by 1.462 (0.684C, 0.214M, 0Y, 0.102K). As described in further detail below, shades of this spot recipe may have the form of:

$$G_a = G*|S|*\vec{S_a} \text{ where } 0 \leq G \leq 1 \quad \text{(equation 2)}$$

such that shades of a spot are emulated using the same gradient as the solid spot.

Once the recipe vector has been determined, image pixels, for example pixels from an image file for printing, can be compared against the recipe vector to identify pixels that represent the spot color. At item 120, a pixel vector is determined. The pixel vector is also represented as a vector within the color space and may be calculated using the same method as the calculation of the recipe vector. For example, the pixel vector may be calculated using equation 1, above.

Once a recipe vector and a pixel vector have been determined, the recipe vector and pixel vector are compared at item 130 to determine whether the pixel is representative of the spot color defined by the recipe. If a pixel vector is substantially similar to a recipe vector, then the pixel is identified as representative of this spot. In some examples, where the direction component of the pixel vector and the direction component of the recipe vector are substantially similar, the pixel may be identified as a shade of the spot, as such the percentage of the shade can be determined by the ratio of the pixel and the recipe sizes.

The comparison between the recipe and pixel vectors may comprise determining a difference between the two gradients of the vectors. For example, when representing each of the pixel vectors in a particular color space with respect to white, for example, a difference function (for example, Euclidean distance) may be used to compare the difference between the recipe and pixel gradient vectors, and if the difference is below a predetermined threshold, it may be inferred that this pixel is meant to represent a spot color or a shade of the spot color.

For example, a difference function d(x,y) may operate on the recipe vector gradient $\vec{S_i}$ and the pixel vector gradient $\vec{S_o}$ such that when $d(\vec{S_o}, \vec{S_i}) <$ threshold it is determined that the pixel is meant to represent a spot color or a shade of the spot color, represented by the recipe $S_i$ and, where representative of a shade of the recipe $S_i$, has a shade value or size $$\frac{|S_o|}{|S_i|}.$$

If it is determined that the pixel is representative of a spot color in the input, the method 100, at item 140, adjusts the color properties of the output pixel according to a new recipe target. For example, the ratios of printing fluids of the print system, such as the ratios of cyan, magenta, yellow, and black printing fluids may be adjusted/altered. For example, these may be adjusted based on feedback, or according to predetermined values and/or ratios which improve the accuracy of representation of the spot color.

The adjustment to the color properties may be dependent on the output of the difference function. For example, in some examples, the amount the color properties are adjusted may be weighted such that the smaller the output of the difference function, the larger the adjustment. In some examples, the weight may be determined according to a fast decaying function, such as:

$$w = e^{\left(-K \times d\left(\vec{S_t}, \vec{S_o}\right)\right)} \qquad \text{(equation 3)}$$

where w represents the adjustment to apply, and K relates to a radius of influence of a spot, the radius being predefined and relating to a radius of influence which may be used to determine the extent and severity of any corrections applied. For example, where the difference, $d(\vec{S_t}, \vec{S_o})$, is below the threshold, the closer the difference is to the threshold. The smaller the adjustment applied to the color properties, the smaller the difference, the closer $\vec{S_o}$ is to $\vec{S_t}$, the larger the adjustment. This helps to keep color smoothness in areas where the spot blends into other colors. A binary correction decision may create large color shifts in areas that are designed to be smooth and a fast decaying weighted correction prevents such cases, thereby ensuring an accurate representation of pure spot shades together with keeping smooth areas where spots are blending into non spot color areas.

In some examples, the adjustment may be done according to a weighted average between the recipe target and the original pixel value:

$$S'_s = w \times S_t + (1-w) S_s \qquad \text{(equation 4)}$$

where $S'_s$ is the output pixel value, w is the weight of the spot recipe, $S_s$ is the pixel value and $S_t$ is the target recipe for the detected spot color.

Once it has been determined what the adjustments to the color properties of an image pixel are, such that the pixel to accurately represent a spot in an image, the adjusted color properties are provided to the printing device. The adjusted color properties may then be used by the print system during the print run without the need to reprocess the input in its entirety.

Figure 2:
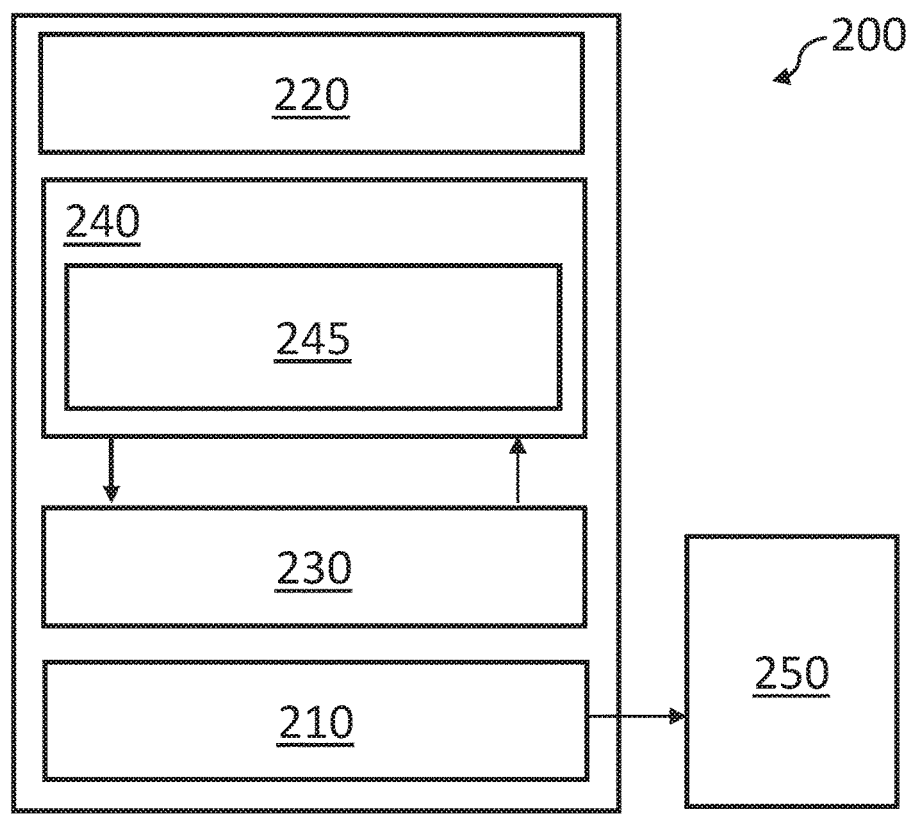
FIG. 2 is a schematic diagram of a print system according to examples.

FIG. 2 shows a printing system 200 according to an example. Certain examples described herein may be implemented within the context of this printing system.

The printing system 200 may be a 2D printing system such as an inkjet or digital offset printer, or a 3D printing system, otherwise known as an additive manufacturing system. In the example of FIG. 2, the printing system 200 comprises a printing device 210, a memory 240 and a processor 230. The processor 230 may be implemented using machine-readable instructions and/or be suitably programmed or configured hardware.

The printing device 210 is arranged to apply a print material to a print target in a printing process, to produce a print output 250. The print output 250 may, for example, comprise colored printing fluids deposited on a substrate. The printing device 210 may comprise an inkjet deposit mechanism, which may, for example, comprise a nozzle to deposit printing fluid on the substrate. The inkjet deposit mechanism may include circuitry to receive instructions associated with depositing printing fluid. The instructions may be received from the processor 230 and may vary throughout a print run according to adjustments of the amount of material to deposit on the print substrate according to the method of FIG. 1, described above. The printing device 210 may comprise a multi-level drop-weight printing device. A multi-level drop-weight printing device is a printing device that is configured to deposit printing fluids with more than one possible drop-weight. In 2D printing systems, the substrate may be paper, fabric, plastic or any other suitable print medium.

A printing fluid may be otherwise referred to as a "colorant". As mentioned above, a printing fluid may correspond to a given base color, where other colors may be formed from combinations of printing fluids. Examples of base colors include, but are not limited to, cyan, magenta, yellow, orange, green, violet and black.

In 3D printing systems, the print output 250 may be a 3D printed object. In such systems, the substrate may be a build material in the form of a powder bed comprising, for example, plastic, metallic, or ceramic particles. Chemical agents referred to herein as printing fluids, may be selectively deposited onto a layer of build material. In one case, the printing fluids may comprise a fusing agent and a detailing agent. The fusing agent and detailing agent may control a temperature of a bed of build material. The fusing agent may comprise an energy-absorbing chemical compound that acts to increase a temperature of a portion of build material. The detailing agent may comprise a cooling agent, such as a water-based liquid, that acts to reduce a temperature of a portion of build material. In this manner, a fusing agent may be selectively applied to a layer in areas where particles of the build material are to fuse together, and a detailing agent may be selectively applied where the fusing action is to be reduced. In some examples, the printing fluids may comprise colorants and may be deposited on a white or blank powder to color the powder. In such an example, a spot color may be emulated using a combination of the printing fluids, which comprise different colorants, by combining known quantities of the printing fluids in order to accurately emulate the spot color. In other examples, objects may be constructed from layers of fused colored powder.

The memory 240 is arranged to store, for a transition region between two input color space nodes in an input color space, data 245 representing spot color recipe, which is a combination of printing fluids in order to emulate a particular spot color.

The operating set of printing fluid combinations stored in the memory 240 may correspond to an operating state of the printing system 200 and/or of a printing process implemented by the printing system 200. An operating state may be a configuration of the printing system 200 that influences how the printing process is performed by the printing system 200. In examples, the operating state relates to a constraint of the printing process and/or of the printing system 200 implementing the printing process. For example, different printing systems may have different operating characteristics, relating to the constraints or capabilities of the different printing systems. In some examples, a given printing system may be configurable with different operating states, for example where a given operating state is associated with a given printing process of a plurality of printing processes performable by the printing system.

In some examples, the printing system 200 may comprise a measurement device 220. The measurement device 220 may be arranged to obtain a measurement of an optical property of an output 250 of the printing device 210. An example optical property to be measured is a reflectance spectrum. The measurement device 220 may be arranged to obtain a measurement of the colorimetry of a predetermined area of the output 250. The colorimetry may be measured from one or more printed patches. The measured colorimetries may be useable to derive values for each of the individual printing fluids, C, M, Y, K, and also to determine an adjustment according to the method described above in relation to FIG. 1. The measurement device 220 may be an optical measurement device. The optical measurement device may comprise a color measurement device. Examples of optical measurement devices include, but are not limited to, photodiodes, spectrophotometers, spectrofluorometers, spectrocolorimeters, tristimulus colorimeters, densitometers and lightness sensors. In some examples, the measurement device 220 is separate from the printing system 200.

The measurement device 220 may be communicatively coupled to the printing system 200, for example via an interface (not shown). In an example, the interface comprises a physical connection. The physical connection may be, for example, a Universal Serial Bus (USB) and/or serial data connection to electrically couple a measurement device 220 such as a spectrophotometer and/or colorimeter, wherein data values are transmitted using an appropriate communication protocol over the interface. The interface may comprise a wired or wireless interface. In an example, the interface comprises a user interface. The user interface may, for example, comprise graphical components such as form fields to receive color measurement data, e.g. data output by a separate measurement device 220. In some examples, the interface is to receive input from an optical measurement device 220.

The processor 230 may be arranged to instruct the printing device 210 to produce an output 250 representative of an input (not shown), wherein the input comprises at least one portion to be printed as a spot color, and the spot color is emulated using the printing fluids present in the printing device 210. The processor 230 may also be arranged to monitor the output 250 using the measurement device 220 and use the measured values of pixels to determine whether an adjustment to the printing fluids in a particular area needs to be made in accordance with the method 100 of FIG. 1.

In some examples, the processor 230 may be a print controller, capable of controlling the output of a printing device 210. Alternatively, the printing system 200 may comprise a separate print controller (not shown) arranged to control the output of the printing device 210, in such examples, the processor may be arranged to generate the lookup table, and store it in memory 240 for example, as part of the input data 245, for use by the print controller.

In some examples, the memory 240 comprises a set of lookup tables for storing data mapping input pixels to output pixels. Data representing any adjustments to the output pixels determined by observation of a previously printed output 250 may also be stored in the lookup table.

The lookup table may be used by the printing device 210 to produce an output 250 such that the output 250 across a print run contains areas of spot colors which are accurately emulated using the printing fluids of the printing device 210.

Figure 3:
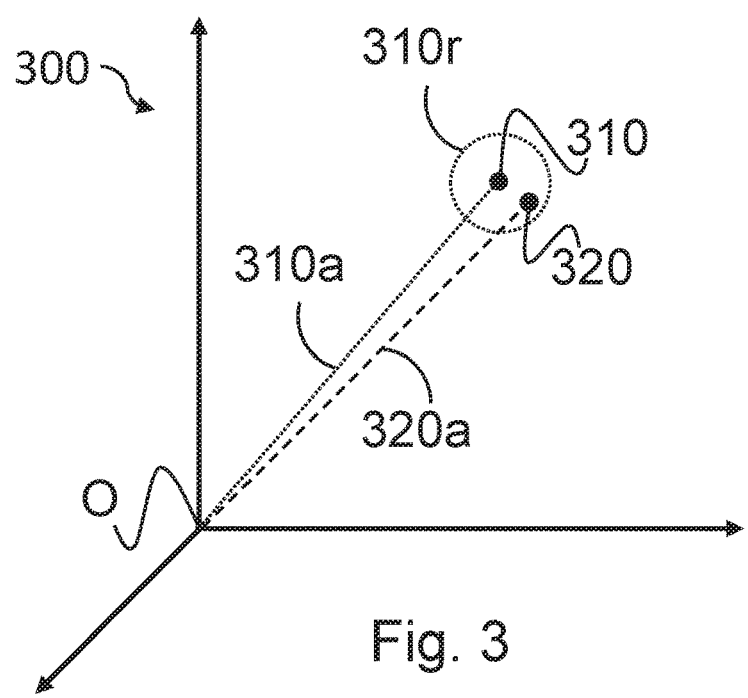
FIG. 3 is a representation of a color space showing an analysis of input pixel and recipe in a color space according to a first example.

FIG. 3 is a representation of a color space 300 showing an analysis of a recipe 310 and a pixel 320 in the color space 300 according to a first example. The color space 300 has an origin O which in some examples represents a white color or color where no printing fluids are added to the print substrate by a printing device, such as printing device 210 described above in relation to FIG. 2.

The recipe 310 is representative of a spot color in an input, such as an image, and the pixel 320 represents a pixel in an output of a processor and the input of a printing device, such as the memory 240 of the printing device 210 of FIG. 2. The pixel 320 represented in the color space 300 may be indicative of the detected characteristics/properties of the pixel in the output by a measurement device such as measurement device 220 of FIG. 2.

Both the recipe 310 and the pixel 320 have their representative vectors 310a, 320a shown in the color space 300. The recipe vector 310a and pixel vector 320a are determined as discussed above in relation to items 110 and 120 of method 100 of FIG. 1.

As mentioned previously, to determine whether the pixel 320 is representative of a particular spot color recipe 310, a predefined radius extending from the recipe 310 which indicates an acceptable tolerance 310r may be used. If the acceptable tolerance 310r includes the pixel 320, then it may be assumed that the pixel 320 is meant to represent the spot color recipe 310. As shown in FIG. 3, the pixel 320 lies within the acceptable tolerance 310r, therefore it may be assumed that the pixel 320 is meant to accurately represent the spot color recipe 310 in the output, and as such the printing fluids used to produce the pixel 320 in the output of the printing device may be adjusted.

It will be appreciated that whilst the acceptable tolerance 310r is represented as a circle in FIG. 3, since both the spot color recipe 310 and the pixel 320 are represented in a multi-dimensional color space 300, the radius of the acceptable tolerance 310r extends from the recipe 310 in every dimension, and as such the acceptable tolerance 310r, in certain examples, is a sphere with the recipe 310 at the center.

Once it has been determined that the pixel 320 is representative of a spot color recipe 310, then an adjustment to the color properties of the pixel may be made according to the target recipe. For example, the ratios of printing fluids of the print system 200, such as the ratios of cyan, magenta, yellow, and black printing fluids may be altered such that the color of the printed pixel is more accurate than the rough assessment given by its recipe. During subsequent outputs of the print system, it can be monitored and corrected on-line to keep its accuracy and consistency.

As mentioned above, the adjustment to the color properties may be dependent on the output of the difference function. For example, in some examples, the amount of adjustment may be weighted such that the larger the adjustment the smaller the output of the difference function. In some examples, the weight may be determined according to a fast decaying function, such as equation 2 above. The difference between the pixel 320 and the spot color recipe 310, within the acceptable tolerance, may be used to determine the extent and severity of any corrections applied. For example, where the difference is below the threshold, the closer the difference to the threshold, the smaller the adjustment applied to the color properties. Also, the smaller the difference, the closer the pixel 320 is to the spot color recipe 310, therefore the larger the adjustment. This helps to keep color smoothness in areas where the spot blends into other colors. Thereby ensuring an accurate representation of pure spot shades together with keeping smooth areas where spots are blending into non spot areas.

Once it has been determined what the adjustments to the color properties of a pixel 320 are, such that the pixel 320 accurately represents the desired spot color in an image, the adjusted color properties are provided to the printing device 200. For example, the updated values may be stored/updated in a look-up table in the memory 240 of the printing device 200. The adjusted color properties may then be used by the print system during the print run without the need to reprocess the input in its entirety.

Figure 4:
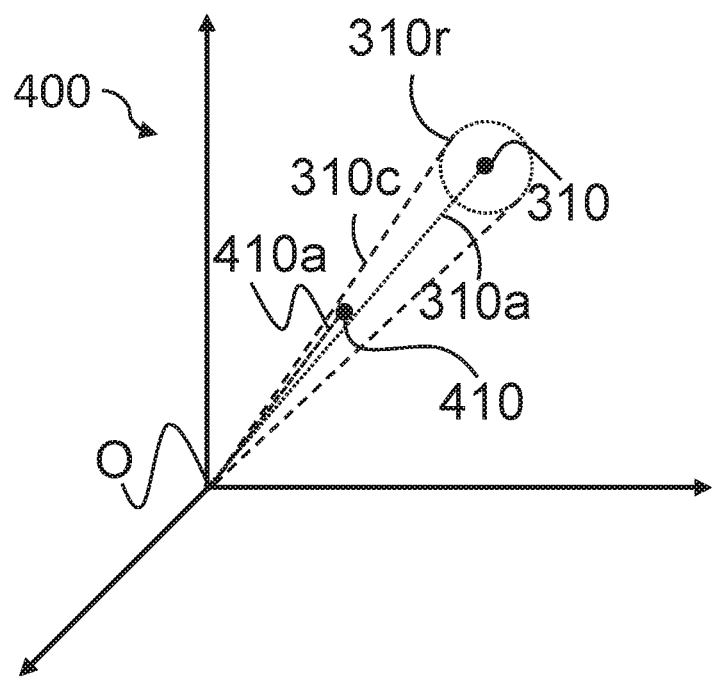
FIG. 4 is a representation of a color space showing an analysis of an input shade pixel and a recipe in a color space according to a second example.

FIG. 4 is a representation of a color space showing an analysis of a recipe 310 and a shade pixel 410 in a color space 400 according to a second example. The color space 400 has an origin O representative of a white color or color where no printing fluids are added to the print substrate by a printing device, such as printing device 210 described above in relation to FIG. 2.

As described above with reference to FIG. 3, it may be determined that an pixel 320 in an output of a processor and the input of a printing device, such as in memory 240 of printing device 200, is meant to be representative of a particular spot color represented by recipe 310 which possesses the characteristics of a spot color in the input to the printing device. However, in some examples, an input pixel may be representative of a shade of the particular spot color. For example, as part of a fade to the color of the print substrate.

In such examples, as with solid spot color representations in the input, such as the memory 240 of a printing device 200, corrections may need to be applied to the shade pixel 410 so that the shade pixel 410 accurately represents the desired shade of the spot color input pixel 310.

To determine whether a shade pixel 410 is meant to represent a shade of a particular spot color, the solid spot color recipe 310 may be represented in the color space 400. The representation of the spot color recipe 310 in the color space 400 may be determined in accordance with the method described above in relation to FIG. 1, and equation 1 whereby a vector of the spot color recipe 310 may be determined based upon the constituent printing fluids and respective ratios of said printing fluids to output a solid representation of the spot color.

Using the solid spot color recipe 310 representation in the color space 400, it can be determined whether a shade pixel 410 in the color space 400 is meant to be representative of a shade of the spot color represented by the spot color recipe 310. This may be determined by comparing the derivatives of the spot color recipe 310 and the shade pixel 410 representation, such that $d(\vec{S}_e, \vec{S}_t)<$threshold, where $\vec{S}_t$ is the derivative of the spot color recipe 310, which is shown as the dashed line 310a in FIG. 4, and where $\vec{S}_e$ is the derivative of the shade pixel 410, which is shown by the dotted line 410a in FIG. 4.

If it is determined that the difference between the derivatives of the shade pixel 410 and the spot color recipe 310 is below a predetermined threshold, then it may be assumed that any shade pixels 410 which are sufficiently close to the derivative 310a of the recipe 310 are meant to be representative of a shade of the spot color input pixel 310. Accordingly, every shade pixel that falls within the cone 310c may be determined to be representative of a shade of a particular recipe 310 of a spot color.

To determine whether the shade pixel 410 is sufficiently close to the derivative 310a of the recipe 310, a process similar to that described above in relation to FIG. 3 may be used. A radius representing the threshold, extending from the recipe 310 indicates an acceptable tolerance 310r. A cone 310c is then drawn from the origin O to the radius 310r. Any pixel that falls within the volume of the cone 310c may be assumed to be in the influence sphere of the recipe 310. as shown in FIG. 4, shade pixel 410 falls within the acceptable tolerance 410c, then it may be assumed that the shade pixel 410 is meant to represent a shade of the solid spot color recipe 310. As shown in FIG. 4, the derivative 410a of the shade pixel 410 lies within the acceptable tolerance 310c, therefore it may be assumed that the shade pixel 410 is meant to accurately represent a shade of the recipe 310 in the output, and as such the printing fluids used to produce the shade pixel 410 in the output of the printing device may be adjusted.

As mentioned above, the shade of the input pixel 410 may be determined by the size ratio between the input pixel 410 and the solid recipe pixel 310, such that:

$$G = \frac{|S_s|}{|S_o|}$$

(equation 5)
where G is the shade adjustment to apply to the printing fluid ratios used to emulate a solid pixel recipe 310, which in turn may have been previously adjusted to more accurately represent the spot color, $|S_s|$ is the magnitude of the shade pixel 410, and $|S_o|$ I is the magnitude of the solid recipe 310.

It will be appreciated that whilst the acceptable tolerance 310c is represented as a cone in FIG. 4, because the spot color recipe 310 and the shade pixel 410 are represented in a multi-dimensional color space, the cone of the acceptable tolerance extends from the recipe pixel 310 in every dimension, and as such the acceptable tolerance 310r, in certain examples is a cone with the recipe pixel 310 at the center of its base and its vertex at the white point.

Once it has been determined that the shade pixel 410 is representative of a shade of a spot color recipe 310, then an adjustment to the color properties of the shade pixel 410 may be made according to the target recipe. For example, the ratios of printing fluids of the print system 200, such as the ratios of cyan, magenta, yellow, and black printing fluids, or as mentioned above, previously determined adjustments made to the solid input pixel, such as input pixel 320 of FIG. 3, may be adjusted, by applying one or more further adjustments based on the magnitude of the vectors representing the recipe 310 and the shade pixel 410, in accordance with equation 5.

As mentioned above, the adjustment to the color properties may be dependent on the output of the difference function. For example, the amount of adjustment may be weighted such that the larger the adjustment the smaller the output of the difference function. The weight may be determined according to a fast decaying function, such as equation 2 above. The difference between the shade pixel 410 and the derivative 310a of the recipe 310, within the acceptable tolerance 310c may be used to determine the extent and severity of any corrections applied. For example, where the difference is below the threshold, the closer the difference is to the threshold (i.e. the larger the difference between the shade pixel derivative 410a and the derivative 310a), the smaller the adjustment applied to the color properties. Similarly, the smaller the difference between the shade pixel derivative 410a and derivative 310a, therefore the larger the adjustment. This helps to keep color smoothness in areas where the spot shades blend into other colors, by ensuring an accurate representation of pure spot shades together with keeping smooth areas where spots are blending into non-spot areas.

Once it has been determined what the adjustments to the color properties of a shade pixel 410 are, so that it accurately represents a shade of the input pixel 310 in an image, the adjusted color properties are provided to the printing device 200. For example, the updated values may be stored/updated in a look-up table in a memory 240 of the printing device

200. The adjusted color properties may then be used by the print system during the print run without the need to reprocess the input in its entirety.

Accordingly, the adjustments to the shade pixel may be represented as:

$$S'_s = w \times G \times S_t + (1-w)S_s \qquad \text{(equation 6)}$$

where $S'_s$ is the adjusted shade pixel, w is the weight calculated according to equation 3 above, G is the shade adjustment calculated according to equation 5 above, $S_t$ is the target recipe, such as recipe 310, and $(1-w)S_s$ is the weighted complement of the present shade pixel, such as shade pixel 410.

In some examples, further correction functions may be applied to an output, for example, a gamma function or a hue shift function which may be used to brighten, darken or change the color hue of an output, such as the output 250 of the printing device 200 of FIG. 2. In such a case, any adjustments may be represented as:

$$S'_s = w \times J_s \times (G \times S_t) + (1-w)J_p S_s \qquad \text{(equation 7)}$$

where $J_s$ is the spot correction function, such as a gamma function. And $J_p$ is a correction function applied to all the process colors. $J_s$ may control each of the process color channels independently to ensure the spot tone is preserved on all shades. It should be noted that the correction table may depend on the spot recipe and shade, and also on other parameters. For example, different corrections may be applied in different image areas or may vary along time according to printer process needs in order to keep the image accurate and consistent on all image areas at all times.

Figure 5:
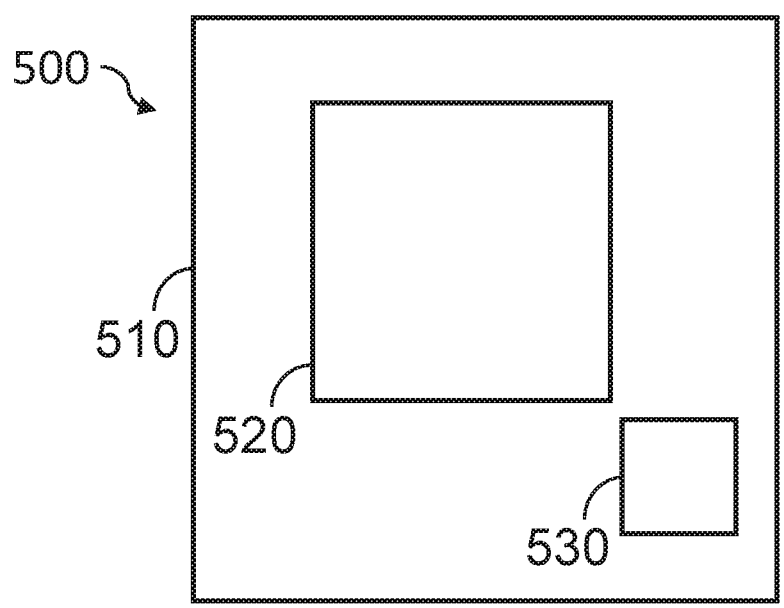
FIG. 5 is a representation of an output of a printing device according to examples.

FIG. 5 is a representation of an output 500 of a printing device, such as printing device 200 of FIG. 2, according to examples. The output 500 comprises an image 510, in which there is a first area 520 to be represented as a spot color, for example, the logo of a company, and where it is desirable to ensure that the color of the logo is accurately represented within the output 500.

In some examples, the image 510 may also include a second area 530 which may contain the spot color or a color which may be sufficiently close to the spot color, that the above method may determine it needs adjusting. However, pixels in the second area 530 may not need to be reproduced as accurately as the spot color within the first area 520. In such cases, the printing device may adjust colors according to the above-mentioned methods in pre-determined areas of the output. For example, in the image 510, the adjustments may be made to pixels within the first area 520, not the second area 530. This prevents adjusting the color values of areas of an image which need not necessarily be adjusted. For example, where an image is of a natural environment, it is probable that some pixels will map relatively closely to a spot color pixel, but the pixel is not representative of a spot color so adjusting it may alter the output 500 in such a way so as to not accurately represent the image 510. As such, a user may be able to define areas of an input in which to apply any adjustments (such as the first area 520) and define areas of an input in which to not apply the adjustments (such as the second area 510).

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
    determining a recipe vector of a recipe to a printing device, wherein the recipe is representative of a spot color in an input image, the recipe vector being based on one or more recipe color properties of the recipe;
    determining a pixel vector of a pixel of an output of a printing device based on one or more pixel color properties of the pixel, wherein the pixel vector is representative of a spot color in an output of a printing device;
    comparing the recipe vector and pixel vector to determine a difference between the recipe and pixel;
    adjusting one or more pixel color properties of the pixel when the difference is below a predetermined threshold, to reduce the difference so as to substantially reproduce the spot color of the input image in the output of the printing device; and
    providing the adjusted pixel color properties to the printing device.

2. The method of claim 1, wherein the one or more color properties comprise the proportions of one or more printing fluids of the printing device.

3. The method of claim 1, wherein the one or more color properties are adjusted to represent a shade of the spot color.

4. The method of claim 1, further comprising determining whether to adjust the one or more properties of the output pixel in the output of the printing device.

5. The method of claim 4, wherein determining whether to adjust the one or more properties of the pixel comprises indicating whether a portion of the output image is representative of an object having the spot color.

6. The method of claim 4, wherein determining whether to adjust the one or more properties of the output pixel comprises determining whether the input pixel is a combination of one or more other colors, other than the spot color.

7. The method of claim 1, wherein adjustment of the one or more output color properties of the output is dependent on the difference between the recipe and pixel.

8. A print system comprising:
    a printing device to apply print material to a print target in a printing process;
    an imager for analyzing an output image of the printing device
    a processor to:
        generate a recipe vector of an recipe to a printing device, wherein the recipe is representative of a spot color in an input image, the recipe vector being based on one or more recipe color combinations of the recipe;
        generate a pixel vector of a pixel of the output image of the printing device based on one or more pixel color combinations of the pixel;
        compare the recipe vector and pixel vector to calculate a difference between the recipe and pixel;
        alter the one or more pixel color combinations of the output pixel when the difference is below a predetermined threshold, to reduce the difference so as to substantially replicate the spot color of the input image in the output image of the printing device according to the target recipe; and
        provide the altered pixel color combinations to the printing device.

9. The print system of claim 8, further comprising storage for storing a lookup table comprising a mapping of the printing fluid proportions to the spot color.

10. The print system of claim 8, wherein the processor is a raster image processor.

11. The print system of claim 8, wherein the processor further comprises a color management module, the color management module responsible for emulating spot colors and determining the adjustments to the pixels.

12. A non-transitory computer-readable storage medium comprising a set of computer-readable instructions that, when executed by a processor of a printing system cause the processor to:
- obtain a recipe vector of a recipe to a printing device, wherein the recipe is representative of a spot color in an input image, the recipe vector being based on one or more color attributes of the recipe;
- calculate a pixel vector of a pixel of a printing device based on one or more pixel color attributes of the pixel;
- consider the recipe vector and pixel vector to determine a difference between the recipe and pixel;
- adjust the one or more pixel color attributes of the output pixel when the difference is below a predetermined threshold, to reduce the difference so as to substantially reproduce the spot color of the input image in the output of the printing device according to the target recipe; and
- provide the adjusted pixel color attributes to the printing device.

* * * * *